March 25, 1941.   F. M. MANUEL   2,236,217
EDUCATIONAL DEVICE
Filed June 21, 1940   5 Sheets-Sheet 1

Inventor
Forrest M. Manuel,
By Albert Grobstein
Attorney

March 25, 1941.　　　F. M. MANUEL　　　2,236,217
EDUCATIONAL DEVICE
Filed June 21, 1940　　　5 Sheets-Sheet 2
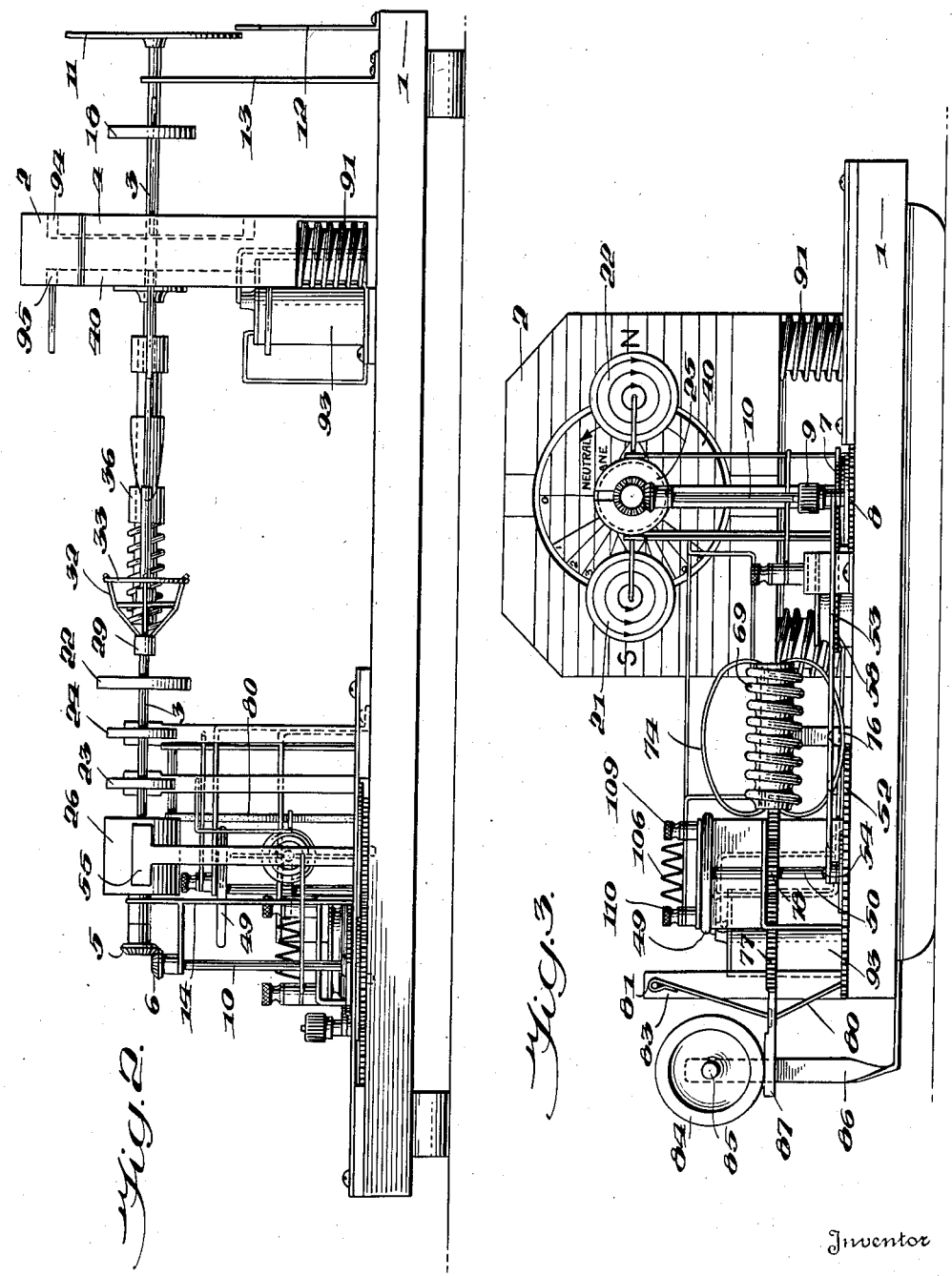
Inventor
Forrest M. Manuel,
By Albert Grobstein
Attorney March 25, 1941.      F. M. MANUEL      2,236,217
EDUCATIONAL DEVICE
Filed June 21, 1940      5 Sheets-Sheet 3
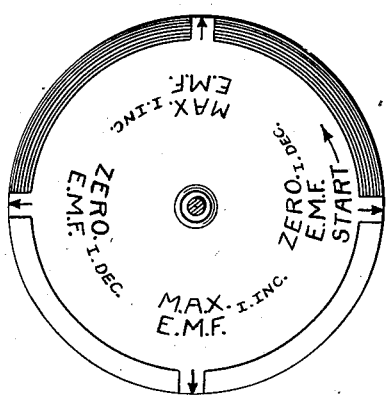
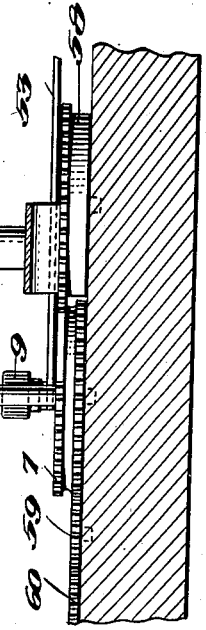
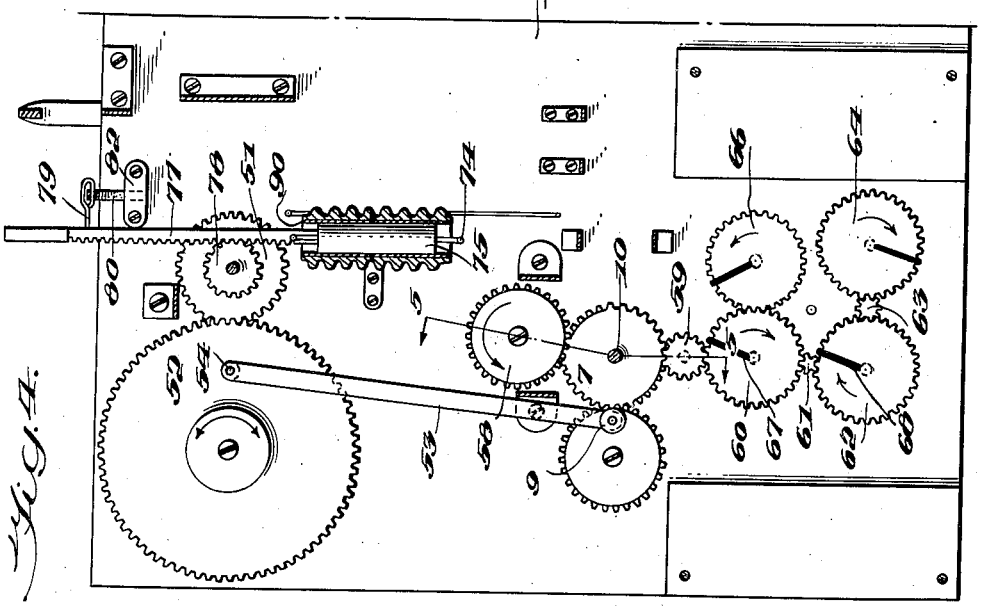
Inventor
Forrest M. Manuel,
By Albert Grobstein
Attorney March 25, 1941.  F. M. MANUEL  2,236,217
EDUCATIONAL DEVICE
Filed June 21, 1940  5 Sheets-Sheet 4

Inventor
F. M. Manuel,
By
Albert Grobstein
Attorney

March 25, 1941.  F. M. MANUEL  2,236,217
EDUCATIONAL DEVICE
Filed June 21, 1940  5 Sheets-Sheet 5

Inventor
F. M. Manuel,
By
Albert Grobstein
Attorney

Patented Mar. 25, 1941

2,236,217

UNITED STATES PATENT OFFICE 2,236,217

EDUCATIONAL DEVICE

Forrest M. Manuel, Washington, D. C.

Application June 21, 1940, Serial No. 341,746

19 Claims. (Cl. 35—19)

This application is a continuation-in-part of my copending application bearing Serial No. 265,808, filed April 3, 1939.

This invention has for its object and relates to an educational device primarily for demonstrating, illustrating and instructing the basic principles of applied electricity, electromagnetism and the like. The device may be used in the class-room for teaching and illustrating the principles of alternating current generators, direct current generators, rotary converters, direct current motors, synchronous motors, transformers, electromagnets; and other electrical and electro-magnetic effects accompanying the operation of electrical equipment, or produced thereby.

Other objects are to provide a working model for the class-room to demonstrate the action of electrical generating and motivating equipment together with means associated therewith for visual teaching of various electrical and electro-magnetic laws and phenomena.

The above objects of the invention also include means for illustrating the generation of direct and alternating currents together with coordinated mechanism depicting the comparative sine curves of these respective currents, and means for showing the direction of such currents as they are generated and in various stages of such generation; mechanical demonstration of electrical and magnetic theories, including means to show distortion of magnetic fields in electric motors and effects produced thereby; means indicating characteristics of current and E. M. F. at various positions of an armature; means for visually illustrating theoretical magnetization of an armature core inductively and simulation of theoretical rotation of the magnetic field produced by current alternations; means for demonstrating expansion and contraction of magnetic flux or lines of force about the inductors in an armature of a generator or motor; means to illustrate the principles and effects of electro-magnetic solenoids, field coils, choke coils or reactance coils, whereby the manifestations of self-induction and mutual induction as well as basic principles applicable to transformers may be demonstrated and explained; mechanical means for visually demonstrating inductance in a circuit; mechanical analogy or demonstration of a condenser; electrostatic capacity in a static condenser and related effects of current direction and rate of flow and displacement; all of which are hereinafter described and claimed.

Other objects of the invention will appear as the description thereof hereinafter proceeds.

In the drawings:

Fig. 2 is a side elevational view of Fig. 1.

Fig. 3 is an end elevational view, looking from the left side of Fig. 1.

Fig. 4 is a plan view of the left side of the apparatus shown in Fig. 2 showing the gearing arrangement beneath the cover chart.

Fig. 5 is an elevational view of a portion of the gearing along the arrows 5—5 in Fig. 4.

Fig. 6 is an end elevational view of the inner face of the disc located at the extreme right-end of the apparatus shown in Fig. 1.

Figure 1:
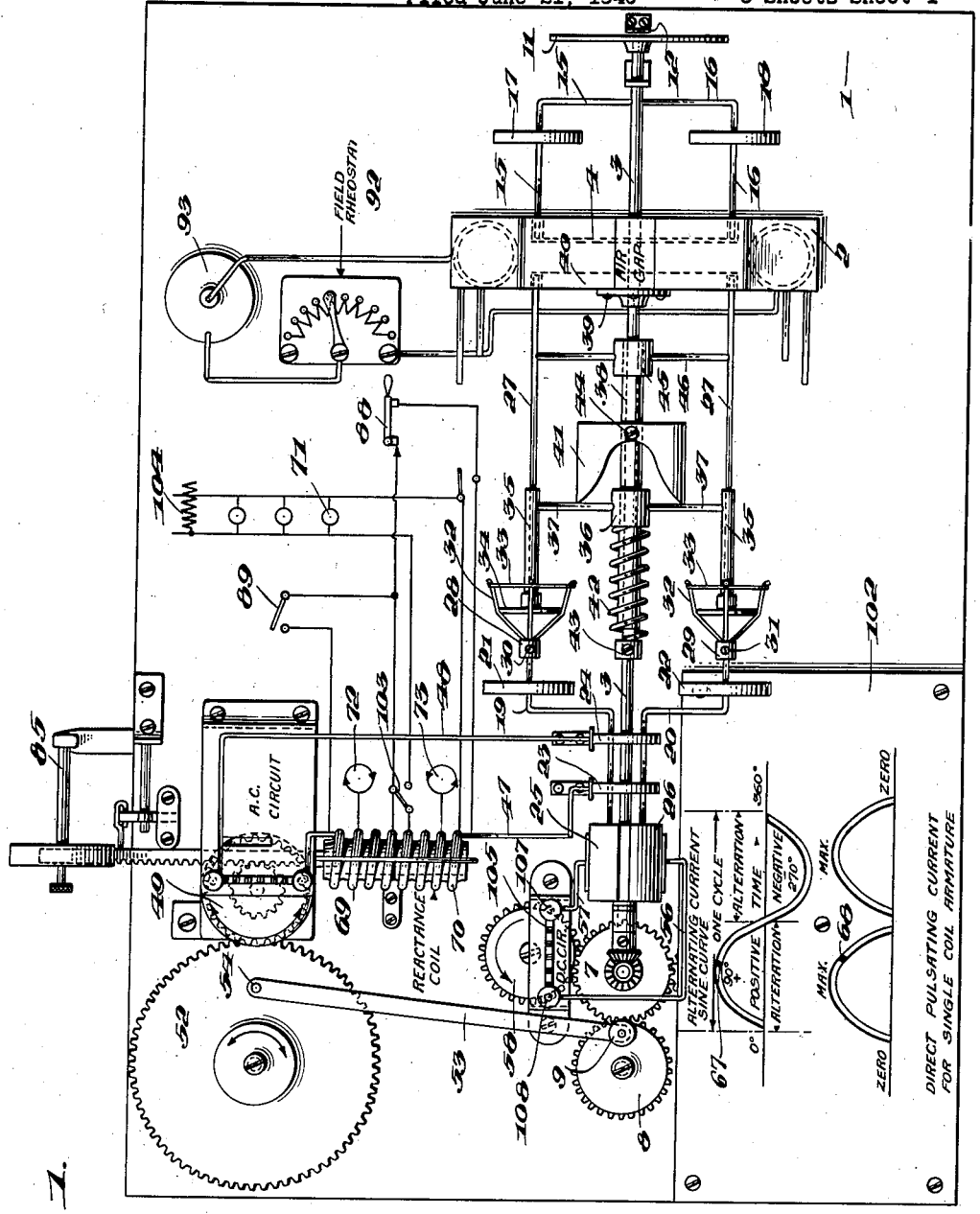
Figure 1 is a plan view of the educational apparatus.

Referring to the drawings, numeral 1 indicates a base upon which the apparatus is mounted. A field magnet element 2 constitutes a frame having north and south polarity and an air gap vertically therethrough at the top and bottom portions. A rotatable shaft 3 passes through an armature core 40 centrally disposed in such field magnet frame 2. The frame of the field magnet 2 has coil windings 91 which are connected in series with field rheostat 92 and a battery 93. The frame of the field magnet 2 has circular grooves 94 and 95 cut in opposite sides thereof, said grooves providing a path for the ends of rotating wires 15, 16, and 27, which wires rotate with the rotatable shaft 3. This shaft 3 has at the end thereof a spur gear 5 which coacts with a spur gear 6 to translate motion from the coacting gears 7 and 8 actuated by force supplied to the element 9, which is manually operated in a clockwise or counter-clockwise direction. The gear 7 causes the stem 10 to rotate, and this rotation is translated through the spur gears 5 and 6 to the rotatable shaft 3. At the extreme outer right end of the shaft 3, a disk 11 is carried showing on its inner face the representation indicated in Fig. 6. This disc 11 cooperates with the pointer 12 to indicate respective positions of the armature from the neutral point of the field magnet. The rotatable shaft 3 is mounted on standards 13 and 14, the latter also having a horizontal portion forming a supporting guide for the rotatable stem 10. The rotatable shaft 3 has fixedly secured thereto the wires 15 and 16 which carry discs 17 and 18 respectively; the shaft also has secured thereto the wires 19 and 20 which carry the discs 21 and 22, respectively. The wires and discs are fixedly secured to the shaft 3 on the opposite sides of the field frame 2 and rotate with the shaft. The discs 21 and 22 have on respective opposed sides thereof concentric circles indicating the direction of the magnetic whirls induced in an inductor depending upon the direction of the current, thus illustrating Lenz' law. Also fixedly secured to the shaft 3 are elements representing collector rings 23 and 24, and elements representing commutator segments 25 and 26. These rings and segments are distinctively colored with contrasting red and white colors so as to indicate polarity and show direction of current. The rotatable shaft 3 has also mounted thereon a device which is intended to mechanically show the expansion and contraction of magnetic flux accompanying induced current at various stages of the revolution of an actual armature in relation to a field magnet in any commercial electrical generator. This expansion and contraction of the flux or lines of force is indicated by a mechanical device carried by and fixedly secured to the shaft 3. This device comprises a supporting wire frame 27 which carries two opposed elements 28 and 29 fixed thereto at points 30 and 31, respectively. Each element 28 and 29 has pivotally secured thereto on the inner face thereof around its periphery a plurality of wire prongs 32, the ends of which prongs are maintained under compressed tension by a rubber band 33. Opposing the tension of the rubber bands 33 are the elements 34 which are radially grooved around their peripheries to accommodate the prongs 32 as guides for such prongs. The elements 34 are fixedly secured to the tubular members 35 which slide over the wire frame 27 and thus cause expansion or contraction of the prongs by such sliding movement in a longitudinal direction. This sliding movement of the tubular members 35 and their pressure elements 34 is one of longitudinal reciprocation. This reciprocation is caused by rotation of the shaft 3 which carries with it the wire frame 27 as well as the elements 28 and 29, as they are all fixed to rotate with said shaft, and while the tubular elements 35 also rotate with the shaft, they are not fixed thereto but are merely carried thereby through the bushing element 36 and supporting wire 37. The element 36 is in the nature of a journal element rotatable about a sleeve 38, through which sleeve the shaft 3 passes in a portion of its length. The sleeve 38 is fixed relatively to the shaft 3 rotatable therein, also relatively to the bushing or journal element 36, the element 38 being fixedly mounted at 39 on a non-rotatable portion of the armature core 40. The tubular 35 supporting element 37 rides on a cam element 41 which is adjustably fixed in stationary position on the fixed sleeve 38, and the spring element 42 is secured at one end to the shaft 3 at the point 43 and is secured at its other end to the journal element 36. It will be observed that upon rotation of the shaft 3, the wires 19 and 20 as well as the extension of these wires 27 will be rotated with the shaft 3, and in their rotation will carry the elements 21, 22, 28 and 29 with them. However, since the tubular sleeves 35 are longitudinally free to slide over the wire frame 27, the rotation of the frame 27 causes the tubular sleeves 35 and their supporting wires 37 to rotate also. However, the rotation of the supporting wire guides 37 is hampered by the fixed cam element 41 and accordingly these wire guides 37 ride up upon the cam surface and thus propel the tubular sleeves 35 together with their pressure abutments 34 in a direction longitudinally of the axis of the shaft 3. This movement in a longitudinal direction, while the frame 27 is rotating, causes the abutments 34 to exert pressure against the pivoted prongs 32 causing them to expand in an outward direction against the tension of their rubber band or other elastic member 33. The pivoted prongs reach their outermost or maximum limits of expansion when the wire guides 37 have reached the highest outermost points of the cam 41. At this point of maximum expansion of the prongs 32, the spring 42 is under its greatest compression. After the top surface of the cam has been reached with the maximum expansion of the prongs, further rotation of the frame 27 causes the wire guides 37 to take a downward course on the cam surface of the element 41 and thus the action of the spring 42 causes the tubular sleeves 35 to reciprocate from their original longitudinal direction, and carry with them the abutment elements 34 to a position away from the points of pivoting of the prongs on the elements 28 and 29. Since the prongs are individually bent to present a humped portion on each prong intermediate its ends, it will be seen that the recession or retraction of the tubular sleeve 35 and the abutment 34 will approach the intermediate space outlined by such hump, and thus the ends of the prongs which are under compression toward each other due to the elastic band 33 surrounding such ends, will approach each other and thus contract in the space that they occupy. Since the cam 41 may be adjusted by the pin 44, the maximum expansion of the magnetic flux will be represented by this mechanism where the armature cuts the lines of force at 90 and 270 degrees respectively, and the greatest contraction will be at zero and 180 degrees of the armature from its neutral point. It will be noted that in the contraction and expansion device just described that the element 45 rotates with the wire 27 joined thereto by support wire 46, and thus the element 45 merely serves as a journal element on the fixed sleeve 38. The elements 34 have notched radial grooves around their peripheries so that the individual prongs 32 ride therein.

The abutment element 34 and tubular sleeve 35 are intended to oscillate or reciprocate one stroke per half revolution of the armature. The contraction and expansion of the magnetic whirls is thus actually seen in mechanical analogy by the expansion and contraction of the elastic bands 33 in concentric form. Such expansion and contraction are so synchronized with the sine curve that a full expansion of the bands 33 take place at 90 degrees. The discs 17, 18, 21 and 22 represent these magnetic whirls (see Figure 3), but the bands 33 actually expand and contract concentrically to show actuality of theoretical movement.

It will be apparent that the cam 41 and spring means 42 are not the only means for causing reciprocation of the tubular sleeves and their attached abutments 34 to effect expansion and contraction of bands 33, as any known equivalent mechanism to cause reciprocation on a rotating shaft may be used; such, for example, a twisted shank and follower thereon similar to that of the ordinary ratchet screw driver.

The collector rings 23 and 24 and the commutator segments 25 and 26 are rotatable with the shaft 3, and it will be noted that the wires 19 and 20 pass through the same in fixed relation therewith in their rotation. The collector rings 23 and 24 are contacted by brushes which carry alternating current into wires 47 and 48. The direction of the alternating current is shown by the alternations of a circuit oscillator element 49, supported upon a pin 50 which derives its alternating motion from a gear 51. The gear 51 in turn is actuated by the gear 52 which receives an alternating or reciprocating motion due to the connecting rod 53 being eccentrically pivoted thereto on the pin 54, the other end of the rod 53 being pivotally connected to the gear 8 at the handle element 9. The reversing movement of the disc 49 in a circular path indicates the alternations of the current, and the disc 49 has a two-way arrow on its face which visualizes the alternating direction of such movement. It will be thus seen that the rotation of the shaft 3 through the force applied at the handle 9 will show the production of alternating current as well as the alternations thereon.

The commutator segments 25 and 26 contact upstanding brushes 55 and these brushes lead direct current through wires 56 and 57 and a resistance element 105. Due to the motion of the gear wheel 7, the gear wheel 58 revolves in a counter-clockwise direction. However, there are some teeth missing from the top set of teeth of the gear 7 and this absence of teeth causes the revolution of the gear 58 to pause momentarily during its revolution, thus visualizing the pulsations of direct current for a single coil armature. The top of the gear 58 is suitably covered with a disc having an arrow thereon showing that the current and the revolution of the disc is continuous in one direction for the direct current taken from the commutator segments, as distinguished from the alternations of the current taken from the collector rings. The resistance 105 represents continuity of the circuit. The gear 7 is a composite gear having two distinct sets of teeth. The upper set of teeth on the said gear have some of the same broken away or missing at opposite points thereof, whereas the lower set of teeth is complete with none missing. The upper set of teeth of the gear 7 contact with the gear 58, while the lower set of teeth contact with the gear 8 and the pinion gear 59. Due to the fact that gear 7 is composite, both sets of teeth fixedly rotate together by actuation of the gear 8. The pinion 59 is geared to the gear 60 which in turn actuates a pinion 61, which in turn actuates a gear 62, which in turn actuates a pinion 63, which in turn actuates a gear 64. The gear 66 is actuated by contact with gear 60. This gearing arrangement is clearly shown in Fig. 4 where the cover chart has been removed to show these gears. Gears 60 and 66 have radial markings thereon, which, when said gears are rotated, show a progressive movement of one part of the mark through a sinuous slot which appears in the cover chart of Fig. 1. This sinuous slot of Fig. 1 is the alternating current sine curve and the rotation of the shaft 3 and its associated parts together with the manual movement of the handle 9 cause a dot 67 to progressively appear through the slot, moving in conjunction with the alternations of the disc 49. The gear elements 62 and 64 lie beneath the direct pulsating current sine curve slots shown at the bottom of the chart in Fig. 1, and a portion of the marking 68 on such gears appears through the said slots, synchronized with the pulsating direct current indicated by the continuous movement of the gear disc 58. The direct current sine curve, as shown on the cover chart 102 in Fig. 1 is geared to the alternating current sine curve and rotates synchronously therewith. The direct current sine curve as shown on the chart depicts the magnitude of current of a one coil armature. It will be noted that the member 68 never falls below the horizontal line as the member 67 does on the A. C. sine curve. It portrays the important fact that all currents generated either in an alternator or a dynamo are alternating in character and that it is due to segments of the commutator reversing its position from its respective brushes at the same instant the armature inductor changes from one pole to another that this rectification of current is accomplished. At the same instant observation of the two sine curves, the internal and external characteristics of the generated current of a dynamo may be studied; the internal by the A. C. sine curve and the external by the D. C. sine curve. The elements 17, 18, 21 and 22 depict on their faces magnetic whirls as shown in Fig. 3, and these elements together with the illustration of alternations in alternating current and pulsations of direct current and coacting gears coordinated with the rotation of the shaft and a chart containing a sinusoidal slot located above the gears depicting the generation of such a curve visually through said slot are all described and claimed in my co-pending application, Ser. No. 265,808.

Referring to Figures 1, 3 and 4, a reactance coil is shown in the alternating current circuit. It consists of a metal tube 90 with several turns of round cord wound around it in anti-clockwise direction, the turns spaced apart and representing insulated copper wire. The metal tube represents a soft iron core, and is colored white, while the winding is colored red. The cord is cut along the entire length of tube in a transverse direction as to make each turn have a visible cross-section, which is colored red to represent continuity of circuit. The coil may be utilized as a reactance coil with a single winding overall, or it may be sectionalized by means of a double-throw single-pole switch 103 if the same is thrown to open position so that the respective portions 69 and 70 of the coil winding function as separate or individual windings. If the switch 103 is closed to place the portions 69 and 70 in series connection, it will be clear that the reactance coil functions as though the coils 69 and 70 are a single coil. The disc 73 is carried on coil 70 by means of a supporting pin, and the disc 72 is carried on the coil 69. When demonstrating self-induction in a reactance coil, the disc 72 is provided with red concentric lines to represent direction of whirls; when demonstrating mutual induction of a transformer with the coils separated in circuit, the disc 73 has black concentric lines to illustrate induced E. M. F. in a transformer. When demonstrating condenser or capacity effects, the entire reactance coil and/or transformer is shunted out of the circuit by closing switches 88 and 89. In Figs. 3 and 4, it will be noted that a band 74, preferably elastic, is joined at opposite ends of a piston element 75. A similar band 76 is joined to the lower half of the piston element 75. As will be seen, both of these bands practically encircle the reactance coil 69 in a vertical direction, and these bands are intended to represent the contraction and expansion of magnetic flux which induces E. M. F. and is cut by the coil windings. As shown in Fig. 3 of the drawings, the elastic bands 74 and 76 are in their greatest expanded position, and any movement of the piston 75 reciprocating in the coil 69 causes a corresponding contraction of the bands 74 and 76 in a radial direction and a lengthening of such elastic bands in a longitudinal direction. This lengthening of the bands in a longitudinal direction is caused by their attachment to the piston 75, which, moving beyond the ends of the coil 69 in either direction, carries one end of the bands with it while the other end is carried or stopped by the other end of the coil which is stationary. This change of shape of both bands from circular to an elongated oval shape represents a change of expanded lines of force to contracted lines of force.

The rubber bands 74 and 76, by contracting and expanding, demonstrate the accepted theory of electromagnetism. This covers the field of electro-magnets, solenoid, field coil, choke coil or resistance coil; in fact, any coil wound around an iron core, the same magnetic polarities are manifested. The reactance coil is a simple electromagnet when the windings 69 and 70 are in series and function as a single winding. However, when separated by the switch 103 into two separate coils or windings, the principle of mutual induction, or the basic principle of a transformer, may be demonstrated. To demonstrate mutual induction, by connecting one winding (such as 69) to a source of direct current (not shown) a flow of current causes the core of coil 69 to become a magnet. The lines of force expend upwardly and cut the windings on coil 70 and generate a voltage therein. This voltage lasts only for the instant occupied to build up a field in the core 90, and as the field reaches its maximum value, the voltage drops to zero. When the current is cut off, the field collapses, and a voltage is momentarily generated in 70, but in the opposite direction. Since a voltage is generated in 70, it is obvious that current would flow in a circuit if connected to it; and if the direct current were continuously applied and cut off with great rapidity to coil 69, a pulsating voltage would be generated in coil 70 that would cause a pulsating current to flow to any circuit connected thereto. Thus energy can be transferred to a resistance 104 in a circuit connected to coil 70, even though there is no electrical connection between the generator and such resistance. Practical use of this knowledge is obtained by applying A. C. current to coil 69 and thus produce a transformer.

Thus, by bridging coils 69 and 70 with switch means, demonstration for dual purpose is obtained; when the switch is closed, the action will be a single coil; when the switch is opened, coil 69 becomes the primary and coil 70 becomes the secondary of a transformer. The piston element 75 constitutes a fixed extension of the ratchet rod 77 which is actuated by the gear 78, driven by the stem 50 and gear 51. It will be thus noted that upon turning the handle 9 to manually operate the gear 8, the ratchet rod 77 will be reciprocated as the gear 8 is given motion. The ratchet piston rod is held in gear by a flat spring held in place by a screw. It may be disengaged from its gearing by an arm pivoted to the housing and brought down at right angles to the rod. By reference to Figs. 3 and 4, it will be noted that the outer end of the ratchet rod 77 carries an eye-bolt 79 secured thereto, through which eye-bolt an elastic band 80 passes. This band is supported at its top from a pin 81 and secured at its bottom to the element 82. The pin 81 is horizontally mounted on the support element 83. Thus, the reciprocation of the ratchet rod 77 causes the elastic band 80 to stretch and elongate, or to expand and contract. This elastic band is intended to demonstrate the mechanical analogy of a condenser, as will be more fully explained hereinafter. Looking at the left hand end of Fig. 3, it will be seen that a wheel 84 is supported for rotation on a pin 85 which is mounted on a support 86. This wheel 84 is intended to illustrate the effect of inductance in a circuit, and the wheel is contacted with slight frictional engagement by the outer smooth surface of the end of the ratchet rod 87, when the same is reciprocated. At the innermost position of the ratchet rod, or its position farthest to the right in looking at Fig. 3, the wheel is completely out of any contact engagement with said end 87 and thus the wheel is free to rotate because of inertia and because of the slight force imparted thereto by the frictional contact of the moving ratchet rod. Thus it will be seen that the ratchet rod 77 in its movement is coordinated with the movement of the gear 8 and its actuated elements, and the rod 77 depicts in its reciprocal movement, the analogy of a static condenser, the analogy of inductance, and the analogy of expansion and contraction of magnetic flux in an electro-magnetic coil, as well as the demonstration in a transformer.

The flywheel 84 is intended to give a true picture of the mechanical analogy of inductance in an A. C. circuit. Inductance is present in a circuit when the circuit possesses magnetic fields therein, due to some form of winding around iron. The flat end 87 of the ratchet rod 77 reciprocates under the wheel 84 when the armature is rotating and makes frictional contact with the wheel the first 90 degrees of rotation. Obviously, this wheel required power to start it moving. Beyond the 90 degrees point of rotation, the wheel loses its surface contact with the rod, but it continues to rotate due to power absorbed from the prime mover. When the rod 77 reaches the end of its stroke and reverses, the flywheel 84 continues to rotate until the rod again contacts the wheel and this time power is absorbed from the prime mover to bring it to a stop and to start it in reverse direction. This operation is repeated at each half revolution.

The mechanical and electrical analogies may be observed at the same time since armature wires, circuit oscillator 49, elastic bands 74 and 76, and flywheel 84 are synchronized to perform their proper functions at the correct time.

Referring specifically to the mechanical analogy of the condenser, the reactance coil is shunted out of circuit and it is to be assumed that the resistance in the A. C. circuit is replaced by a condenser. With the sine curves at zero and the armature in neutral position (white wire 19 at top and red wire 20 at bottom), the piston 75 will be fully extended to the right. The elastic band 80, representing counter E. M. F. of the condenser, will be fully stressed to the right. The band 80 is stressed to the limit at the 90-degree position of the armature by loosening the set screw on the armature shaft and rotating the armature 90 degrees anti-clockwise and re-tightening the screw. This synchronizes the armature with the band 80 as well as the indicator for the correct direction of current. By bringing the armature back to neutral position, the band 80 is unstressed and in a vertical position. When the armature is at 90 degrees, the maximum induced voltage is reached, and the band 90 will be fully stretched or stressed to the right with the piston 75 at limit of its stroke on the right, and thereby a visualization of elastic power stored up in the band is seen as assisting in reversing the piston rod at the end of its stroke; the piston rod 75 representing applied E. M. F. of the generator, and the elastic band 80 representing a dielectric or condenser plates when in neutral or unstressed condition, and a counter E. M. F. when in stressed condition.

The endless bands 74 and 76 previously showing flux of the reactance coil may now represent rate of flow of electric charging displacement current, and A. C. circuit resistance 106 may be replaced by a miniature condenser, where demonstration of condenser effects is desired. The bands 74 and 76 expand and contract to show rate of current flow in accordance with the visual counter E. M. F. set up in the band 80 by its being stressed. It will be understood that many variations are possible in demonstrating static condenser and allied effects.

Figure 9:
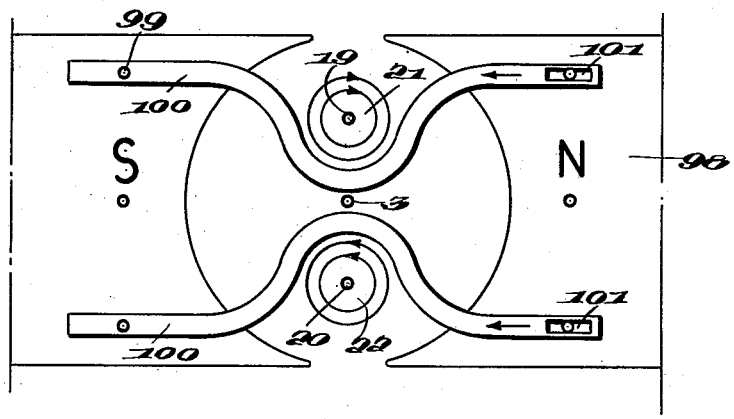
Figs. 9, 10 and 11 are detail views in elevation showing the mounting of rubber shapes on a field frame for indicating the distortion of the magnetic field in a motor armature and the effect thereof.
Figure 10:
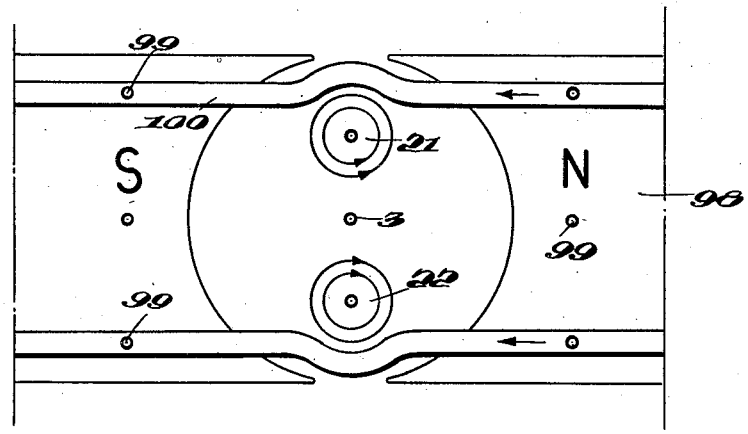
Figure 11:
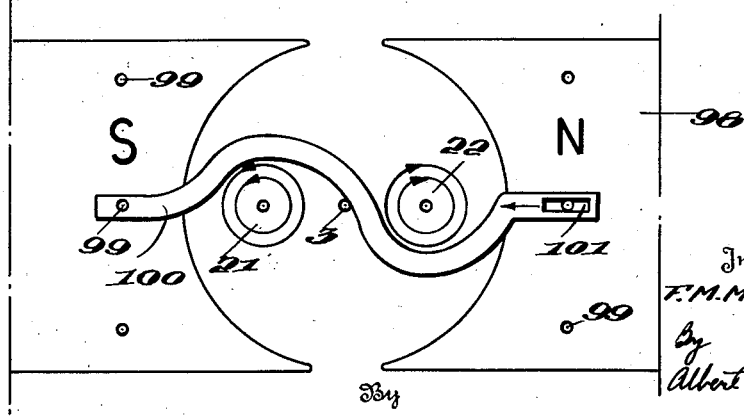

Figures 9, 10, and 11 respectively, are intended to illustrate various principles relating to direct current motors. The field frames of such motors are represented by the numerals 98 and on such frames are horizontally extending pins 99 capable of supporting flexible or elastic elements 100 thereupon. Each of the elastic elements 100 may be removed or replaced on the pins 99, and they have slots 101 therein to facilitate placing them on the pins or removing them therefrom. These elastic elements are preferably molded from rubber so that they may be stretched in use from their sinuous form to a form approximating a straight line. The elements 21 and 22 are shown diagrammatically in these Figures 9 to 11 as they are fixed on the wires 19 and 20 rotating with the central shaft 3. The elastic members 100, when placed over the pins 99 in the positions shown in Figs. 9 to 11, are intended to represent lines of force passing from the field magnet through the armature, and by stretching these elements manually, the magnetic stresses and their effects are demonstrated. Figure 10 shows elements 100 in stretched position. Thus, the principle of a direct current motor is demonstrated by rubber or other elastic material permanently molded into a shape representing the distorted magnetic field of an electric motor.

This demonstration is accomplished by the use of three molded shapes so arranged about the armature conductor in certain positions as to illustrate the magnetic interactions of each side of the armature and field; these molded shapes representing the permanent distorted field. As explained, each shape has one hole at one end and a lateral slot at the other end for sliding on pin 99 when the mold is straightened by a pull of the hand. Two of the three shapes are exactly of the same shape and used for the illustration of the armature coil in its vertical position; the other one has a slightly different construction in form and illustrates the armature wires at the ninety degree position. These shapes have directions indicated by arrows. The mechanical demonstration of the electrical theory of the D. C. motor principle is as follows: Unloosen set screw at end of armature shaft, and thus detach the armature so it will be free to rotate. Put armature in 270 degree position, or the white side of armature wire 20 on north pole side. This places the red whirls on disc 22 in right position. Now center shape 100 with arrow pointing the same as field pole points, place end of shape over disc of red wire 19 and the other end over shaft and under white wire disc 22 and insert pin provided for the hole. This is the position shown in Fig. 11. Assuming that the field is energized and the lines of poles are straight as indicated and as there is no current flowing through the armature, there is no distortion of the field and consequently no rotation of the armature. Assuming that the positive terminal of a battery is connected to the positive binding post so marked on the D. C. circuit, the current will then flow through the armature, that is, in through white commutator segment through white wire and away from observer and the whirls of armature discs will indicate the direction of magnetic field about the white and red inductors, and as these whirls have expanded outwardly and thereby placed a mechanical stress on the magnetic lines of the motor field, it causes them to bend downwardly on the right and upwardly on the left. These lines have a tendency to straighten and shorten, just as a rubber band would do under the same conditions. Since the lines of force tend to straighten and shorten, they exert a power or torque on the armature wire which causes the white wire to move up and the red wire to move down. This is vividly demonstrated when the shape 100 is manually pulled in a straight line. Both sides of armature wires act in unison and tend to produce rotation of armature wires around its axis. When the wires have rotated until they have assumed a position at right angles to the direction of the field the tendency to cause its rotation becomes zero. Figure 9 shows this condition. The two similar shapes are placed on pins so provided on sides of poles to depict this demonstration. It will be noted that the force on each inductor is equal and the field lines urge will be straight up on one and down on the other. It will also be noted that the top armature inductor disc shows the whirls opposing the north pole of the field on the top half of disc and the lower half of top disc is in the same direction as those of the field. It is obvious that there would be no tendency for the inductors to rotate in either direction, as the inductors are on dead center. However, in an actual commercial motor, when the inductor rotates into position of Fig. 9, the commutator reverses the current in them and the flux of the field is distorted as in Figure 10. This reversal of current and the distortion of the field is demonstrated by simply reversing the position of the shape of Fig. 9. It is to be noted in the position of Fig. 10 when the current has reversed in the coil that the black whirls on the back of the disc will show the top part in the same direction as the field, and the lower half of disc the whirls are opposing the field, hence the reason of the distortion and the cause of the field lines bulging outwardly. It is to be noted that the armature inductors are still on dead center and only the magnetic action has changed position but in this case it will just be opposite to what it was in Figure 9. In an actual motor there will always be inductors in the armature in a position as in Figure 11, so it may start rotating from any position. It is possible for a one coil armature to rotate continuously if it is assisted off dead center by a spin, as the inertia will carry it over dead center. As noted above, the discs 17, 18, 21 and 22 are colored with red concentric circles on one side of each respectively, and black circles on the reverse side of each, as clearly described in my copending application, Ser. No. 265,808.

With reference to Figure 6, the inner face of the disc 11 on the extreme right end of the shaft 3 is shown. It is divided into two main sections, one of which is colored red and the other white, to conform to the coloring of armature wires 15, 16, 19 and 20. Each respective section is divided into quarters, representing the two zero and two maximum points in a cycle, as well as the disposition of current values that may be read at the point indicated by an arrow, as the armature rotates. On the outer face of the disc 11 are numerals representing degrees and the angle the armature wire is from the neutral point; or known as the starting point for demonstration purposes.

Figure 7:
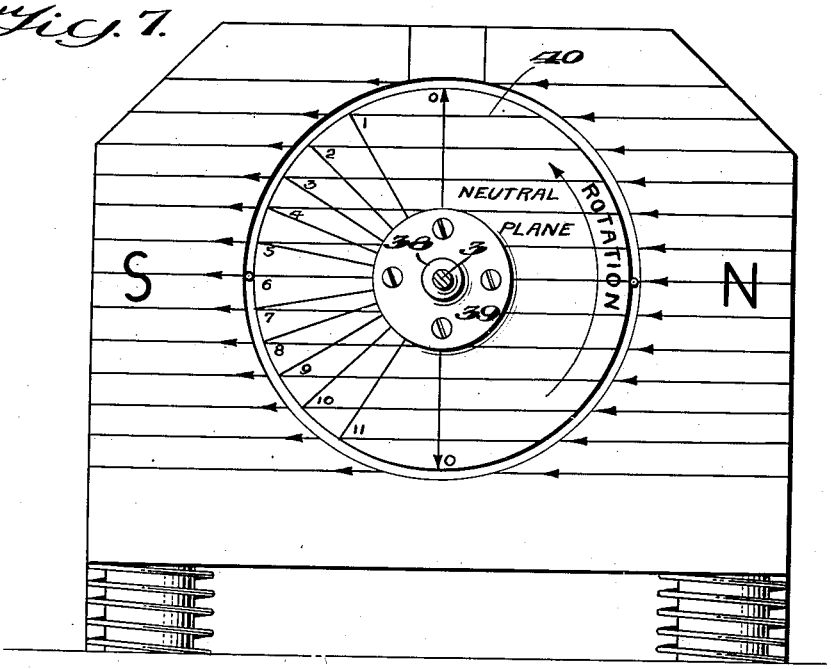
Fig. 7 is a detail elevational view of the stationary part of the armature core of Fig. 3 in its association with the field magnet.

Referring to Figures 1 and 2, it will be seen that the face 40 is a stationary element of the armature core and the representations on said face are shown in detail in Fig. 7 and demonstrate the cutting of lines of force when a core is stationary and the windings rotate around it. This armature core has on its face shown in Figure 7 parallel markings of lines of force passing therethrough, and in addition angular markings radially outward from the center, such angular markings depicting different angles and sectors with a zero line running vertically through the center of the armature core from the top air gap to the bottom air gap. These indicate the arc in which lines of force are cut from the neutral point. The face 4 of the armature core is made rotatable and thus revolves with the windings in order to visually illustrate the theoretical magnetizing of the core inductively. This face 4 and the accompanying associated field magnet is shown in detail in Figure 8 of the drawings. The representations of crosses in the circles 96 are depicted in black whereas the dots in the circles 97 are shown in red.

Figure 8:
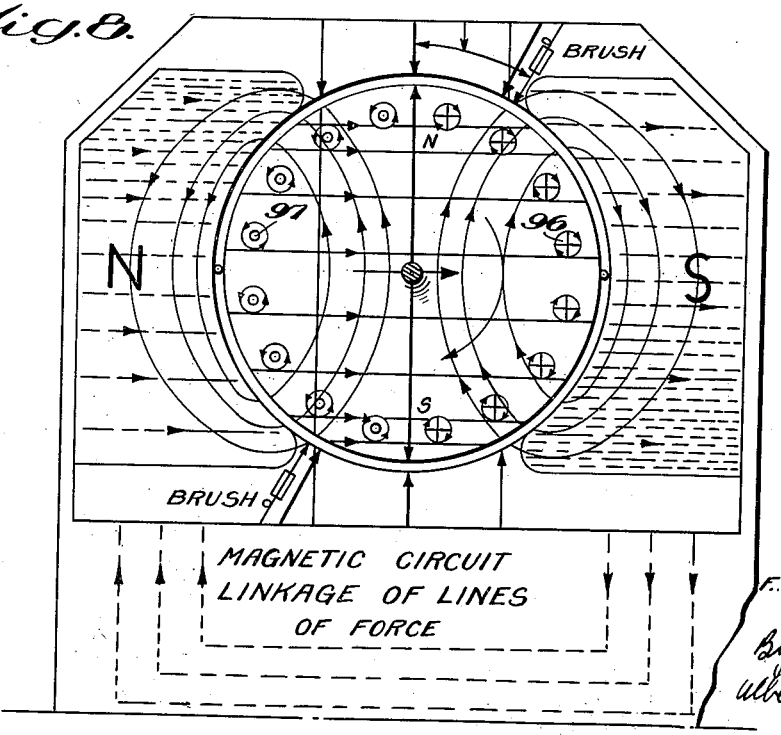
Fig. 8 is a detail elevational view of the representations on the rotatable part of the armature core of Fig. 2 in its association with the field magnet.

The study of armature reactions are simulated by the markings on the Figure 8 view of the field coils and armature core. It will be noted that when the armature core is in the zero position, the lines threading therethrough are straight when no current is assumed to be passing through the armature, but when a current is assumed to be passing through, by rotating the armature, the lines on the core move in the direction of rotation and the left side of core takes an upward direction and the right a downward direction, the lines being thrown out of juxtaposition at angles to each other representing distortion and the shifting of the magnetic field, and thereby visually depicting the physical definition of the terms normal neutral plane, neutral plane, and commutating plane. The oval shape lines represent the direction of lines through the field cores when the armature is energized and the field deenergized. The position of the brushes are advanced from the normal neutral plane to the commutating plane in the drawings in Fig. 8.

The present device is colored by contrasting colors (preferably red and white) to indicate polarity of parts where possible, or for other indications in the interest of simplicity of instruction. It is preferred to color the field magnet black and the armature core white, with the air gaps white. The wires 15 and 19 are white, and the wires 16 and 20 red. The segment 25 is white and the segment 26 red. The collector ring collars 23 and 24 are distinguished from each other in color, but since alternating current polarity is constantly reversing, both leads 47 and 48 are the same color. The contact brushes 55 do not change in polarity since they portray direct current only to the binding posts 107, 108. The binding posts 109, 110, alternate in polarity.

The entire structure provides a neat model for class-room teaching and demonstration, whereby visual significance is afforded to the material aid of understanding theories, laws and principles to electricity.

While the preferred embodiment is shown and described, it will be understood that the invention is not to be slavishly restricted thereto, and is to be limited only by the scope of the appended claims.

What I claim is:

1. In a demonstrational device for teaching electrical principles, an element adapted to represent a field magnet, an element centrally disposed in said magnet and adapted to represent an armature core, a rotatable shaft passing through said core and when rotated indicating relative movement between an armature and said field magnet, means carried by said shaft adapted to represent inductors, and means associated with said inductor means capable of expanding and contracting to represent expansion and contraction of magnetic lines of force accompanying simulated induced current caused by relative movement between armature and magnet.

2. In a device of the class described, an element adapted to represent a rotatable armature shaft, and means supported by said shaft and rotatable therewith capable of expanding and contracting concentrically to represent theoretical manifestations of magnetic flux accompanying simulated induced current produced by rotation of the shaft.

3. In a device for teaching and demonstrating the principles of electricity, means to illustrate the generation of electrical current and circuit produced thereby, and means in said circuit to illustrate electromagnetic effects, said latter means comprising an element adapted to represent an iron core and an element adapted to represent a winding located on said iron core to simulate an electromagnetic coil and means on said coil with representations thereon of simulated induction effects produced therein.

4. In a device for teaching and demonstrating the principles of electricity, means adapted to represent an electromagnetic coil and means associated therewith capable of visually representing expansion, contraction and direction of magnetic flux induced in a real electromagnetic coil by an electrical current.

5. In a device of the class described, mechanical means for visually demonstrating inductance in an electrical circuit comprising a wheel mounted idly for rotation about its center, and a reciprocating bar for causing rotation of said wheel intermittently in clockwise and counter-clockwise direction.

6. In an educational device for teaching laws, phenomena and theories of electricity, mechanical means for visually demonstrating the action of capacitance of a condenser in an electrical circuit comprising elastic means mounted to be capable of being stretched from an unstressed condition, and means for causing it to be stretched and permitting it to return to such unstressed condition.

7. In an educational device for teaching laws, phenomena and theories of electricity, mechanical means for visually demonstrating the theoretical action of capacitance of a condenser in an electrical circuit comprising elastic means fixedly mounted at its opposed ends, and means therewith capable of reciprocating and stretching said elastic means through an amplitude in at least one direction from a position of less stress.

8. In an educational device of the class described, an element adapted to represent a field magnet, an element adapted to represent an armature core mounted for relative rotation with said field magnet element, and representations on said elements capable of visually illustrating theoretical rotation of a magnetic field produced by current alternations in a real electrical generator.

9. In an educational device of the class described, an element adapted to represent a field magnet, an element adapted to represent an armature, and means having sinuous shape for being positioned in engagement with said magnet and element and capable of being changed in shape in visually demonstrating distortion of magnetic fields in electric motors.

10. In an educational device for teaching electrical phenomena, an element adapted to represent a field magnet, an element adapted to represent an armature in cross-section therewith, support means on said field magnet element, and an elastic element capable of being mounted on said support means and across said armature to visualize the course of magnetic lines of force, whereby change of shape of said elastic element by an operator from sinuous to straight may demonstrate effects of magnetic distortion in a motor or generator field.

11. For use in an educational device for teaching electrical phenomena, an elongate element adapted to represent magnetic lines of force and capable of being changed from sinuous shape.

12. In an educational device for teaching electricity, means for illustrating the generation of direct and alternating current, and means actuated thereby by common mechanical movement depicting the comparative sine curves of said respective currents as they are generated.

13. In an educational device of the class described, elements adapted to represent electrical generator parts, means adapted to move said parts for visual demonstration of electrical and magnetic effects, means adapted to represent direction of current as generated in an electrical circuit, an element representing an electromagnetic coil in said circuit, means associated with said coil representing direction expansion and contraction of magnetic flux in said coil, reciprocating means causing said direction expansion and contraction, and means demonstrating inductance actuated by said reciprocating means.

14. In an educational device of the class described, means adapted to represent an iron core, means adapted to represent a plurality of coil windings on said core, means capable of representing the windings in series connection as a single coil to demonstrate self-induction and as independent coils to demonstrate mutual induction.

15. In an educational device of the class described, gear means, means to rotate said gear means, a rotatable shaft actuated by said gear means and depicting relative motion between a field magnet and armature in electrical equipment, and reciprocating means actuated by said gear means demonstrating capacitance and inductance in electrical circuits.

16. In an educational device of the class described, gear means, means to rotate said gear means, a rotatable shaft actuated by said gear means and depicting relative motion between a field magnet and armature in electrical equipment, means visually indicating direction of depicted currents generated and actuated with said first named gear means, and means actuated by said first named gear means depicting the sine curves of said currents as they are generated.

17. In an educational device of the class described, an element adapted to represent a field magnet, an element adapted to represent an armature core, a rotatable shaft indicating relative movement between an armature and said field magnet, and a disc on said shaft and rotatable therewith having representations thereon indicative of polarity and electromotive force at any point of rotation of the armature.

18. In an educational device of the class described, means adapted to represent the generation of A. C. and D. C. electrical currents, means adapted to represent electrical circuits for such A. C. and D. C. outputs and connected thereto, means coordinated with said generating means and actuated by common mechanical movements to visually indicate direction of said currents as generated, means coordinated with said generating means to visually indicate magnitude of said currents as generated, and means coordinated with said generating means to visually indicate inductance and capacitance effects in said circuits.

19. In an educational device of the class described, a first gear having means thereon for manually rotating the same, a second gear operatively connected to said first gear, a rotatable shaft operatively connected to said second gear, a third gear, a connecting rod operatively connecting said third gear and said first gear at eccentric points on their respective faces, a fourth gear operatively connected to said third gear, a ratchet rod mounted for reciprocation and actuated by said fourth gear, and additional gear means in operative connection with said second gear; whereby manual rotation of said first gear means causes rotation of the shaft, reciprocation of the ratchet rod, and rotating movement of said additional gear means.

FORREST M. MANUEL.